Feb. 13, 1940. A. L. RICHE 2,189,996
CONTROL APPARATUS
Filed Feb. 27, 1937 3 Sheets-Sheet 1
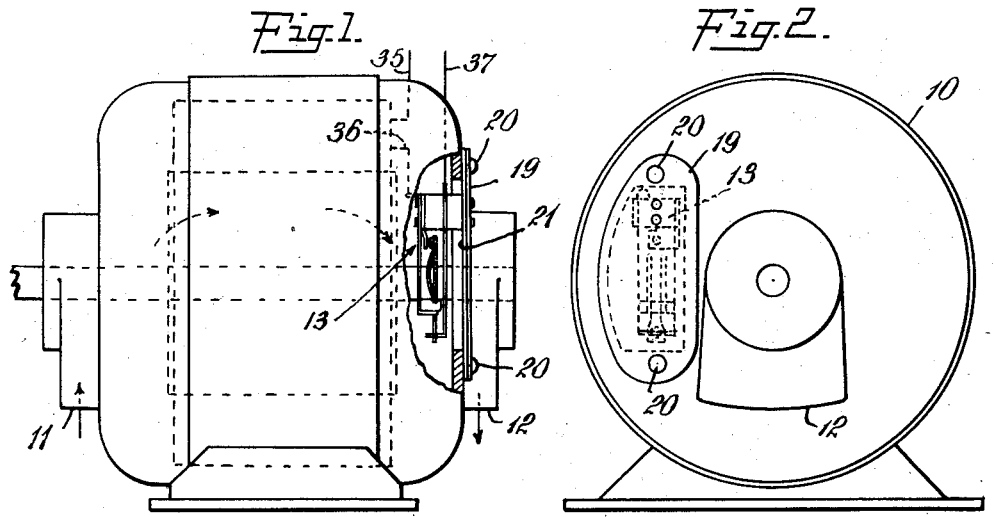
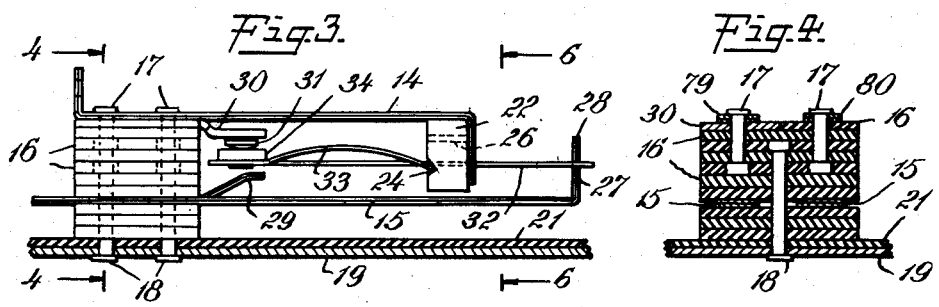
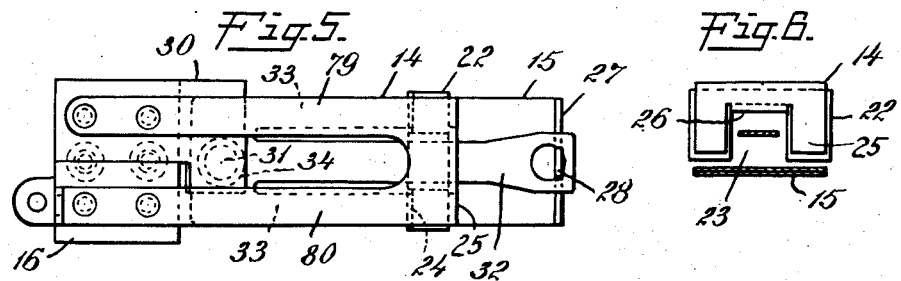
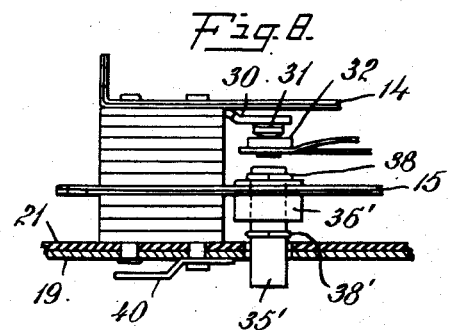
INVENTOR
Arthure L. Riche
BY
Pennie Davis Marvin & Edmunds
ATTORNEYS Feb. 13, 1940. A. L. RICHE 2,189,996
CONTROL APPARATUS
Filed Feb. 27, 1937 3 Sheets-Sheet 2
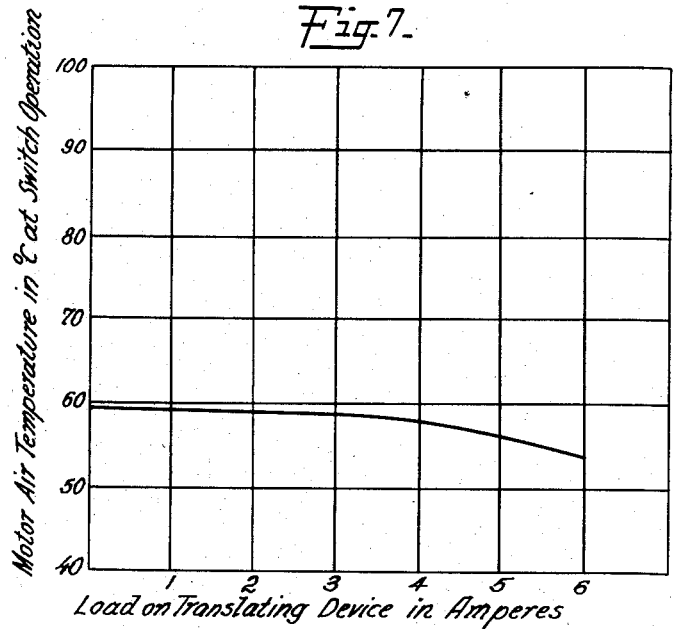
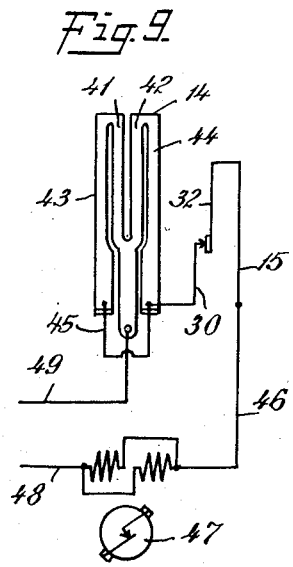
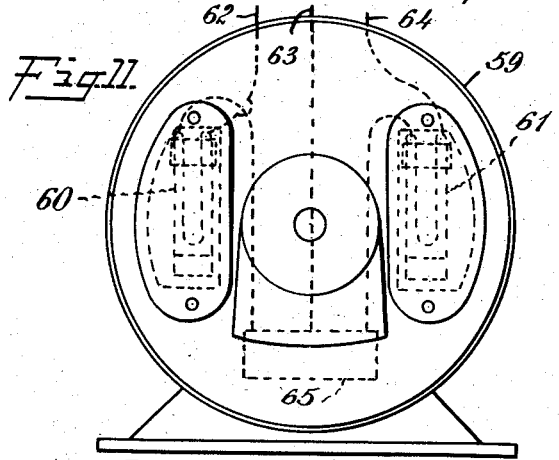
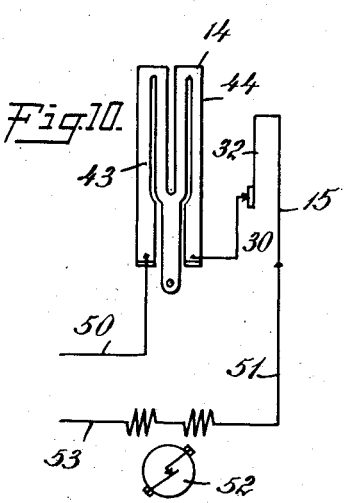
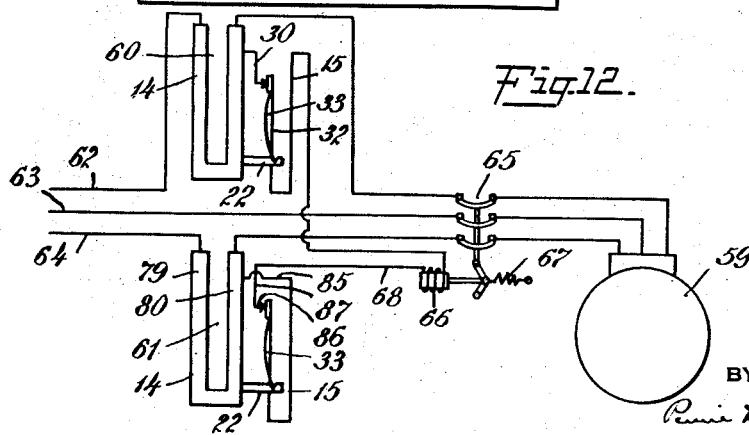
INVENTOR
Arthur L. Riche
BY
ATTORNEYS Feb. 13, 1940.                    A. L. RICHE                    2,189,996
                              CONTROL APPARATUS
                           Filed Feb. 27, 1937          3 Sheets-Sheet 3
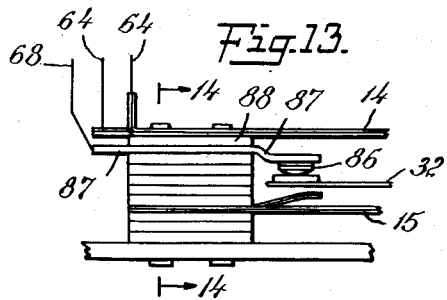
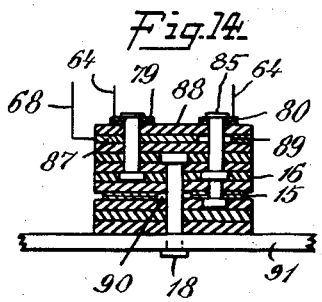
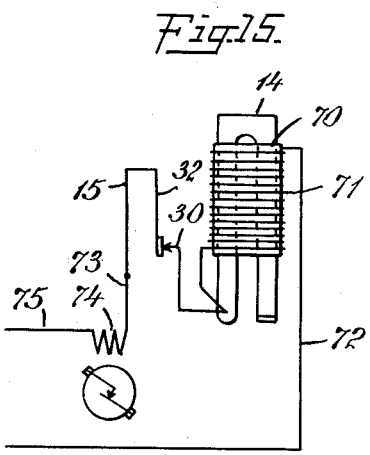
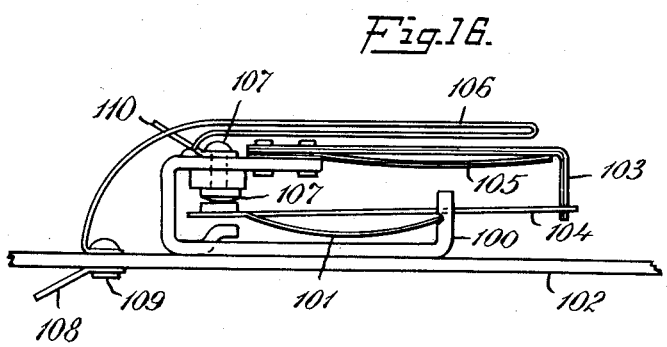
INVENTOR
Arthur L. Riche
BY
Pennie Davis Marvin & Edmonds
ATTORNEYS Patented Feb. 13, 1940

2,189,996

UNITED STATES PATENT OFFICE 2,189,996

CONTROL APPARATUS

Arthur Lewis Riche, Freeport, Ill., assignor, by mesne assignments, to Micro Switch Corporation, Freeport, Ill., a corporation of Illinois Application February 27, 1937, Serial No. 128,206

16 Claims. (Cl. 200—113)

This invention relates to temperature control apparatus and particularly to apparatus for controlling the temperature of translating devices and protecting them against excessive temperatures, which may be caused by overloads, short circuits, faulty ventilation, high ambient temperatures and other conditions.

If a translating device is subjected to continued small overloads, or if the ventilation is restricted, or if the ambient temperature is high, it gradually becomes heated until the maximum safe temperature is reached. If it is subjected to a sudden large overload, such as occurs when the device is installed, or to a short circuit, it becomes heated rapidly to such temperature. Thermostatically controlled apparatus has been provided in the past for the purpose of disconnecting the energizing circuit when the maximum safe temperature of the translating device is reached under the said conditions of temperature rise, and it is the object of this invention to provide improvements in such apparatus.

It is the object of the invention to provide control apparatus of the character described which is simple and convenient to manufacture and install and is effective and accurate in its control of the temperature of the translating device under the said different conditions of temperature rise, and one which possesses flexibility of adaptation to different conditions of service.

In the drawings:

Fig. 1 is a side view partly broken away, of a translating device with the control apparatus of this invention mounted therein;

Fig. 2 is an end view of the translating device of Fig. 1;

Fig. 3 is a side view of the control apparatus of this invention;

Fig. 4 is a sectional view along the line 4—4 of Fig. 3;

Fig. 5 is a plan view of the control apparatus;

Fig. 6 is a fragmental sectional view along line 6—6 of Fig. 3;

Fig. 7 is a graph showing the operating characteristics of the control apparatus;

Fig. 8 is a side view of a modification of the control apparatus;

Fig. 9 is a view showing a modification of a member of the control apparatus, including a diagram of circuit connections suitable for use with said modification under one set of conditions;

Fig. 10 is a view similar to Fig. 9 showing the circuit connections for a different set of conditions;

Fig. 11 is an end view of a translating device having a double control apparatus associated therewith;

Fig. 12 is a diagram of a circuit arrangement employing the double control apparatus shown in Fig. 11;

Fig. 13 is a side view of a modification of the control apparatus of this invention;

Fig. 14 is a transverse, sectional view along line 14—14 of Fig. 13;

Fig. 15 is a view, partly in diagram of a further modification of the control apparatus; and Fig. 16 is a side view of a further modification of the control apparatus.

In the circuit diagrams the translating device is indicated to be an electric motor of the repulsion induction type, but it is understood that the control apparatus may be used with any type of translating device, operated by either alternating or direct current.

The control apparatus of this invention, which is indicated in general by the number 13, is mounted upon the interior of the stationary portion of the translating device 10 and out of direct thermal conductive relation therewith. The translating device illustrated in Fig. 1 is of the self-cooling type in which the rotating portion causes a stream of cooling air to enter at inlet 11 and exhaust at the outlet 12. The control apparatus is located adjacent the outlet whereby the temperature of the air surrounding the apparatus is proportional to the heating effect to which the translating device is subjected. The control apparatus is also adapted for use with translating devices in which there is no stream of cooling air, but in which the air is enclosed within a frame or housing and becomes heated uniformly because of the turbulence which is caused by the movement of the rotating portion. The control apparatus may be placed in any suitable location and preferably is arranged as shown in Fig. 1 so that the heat is radiated directly to it from the windings, preferably the stationary windings, of the translating device, in addition to being carried to it by the air within the enclosing frame.

It has been found that the transfer of heat to the control apparatus by means of direct radiation from the heated coils or by means of the heated air within the frame or housing is more prompt and bears a more constant and reliable relation to the temperature of the hot zone than does the transfer by conduction through the frame or housing itself. By "hot zone" is meant the region within the translating device which becomes the hottest and where failure is apt to occur under rising temperature conditions.

The general design of the thermal temperature control apparatus of this invention is similar to that of the Malcolm W. Eaton application Serial No. 52,771, filed December 4, 1935. The form of apparatus shown in Figs. 1 through 6 comprises two thin arms 14 and 15 of temperature responsive material, preferably bimetal, mounted at one end thereof upon a supporting member 16 and extending in the same direction therefrom. Arm 14 comprises two fingers 79 and 80 which are joined at the free, or unsupported ends thereof. Supporting member 16 is composed of a plurality of sheets of insulating material held together by means of metal rivets 17 and 18 in such manner that the arms 14 and 15 are thermally and electrically insulated from each other, as shown in Fig. 4. The apparatus is fastened by rivets 18 to a mounting plate 19 which is mounted over an opening in an end of the frame of the translating device 10 and is held in place by screws 20. A sheet of heat insulating material 21 is interposed between the plate 19 and the frame of the translating device and a similar sheet is interposed between plate 19 and control apparatus 13 to insulate the arms 14 and 15 from the heat of the frame. Both arms are shown to be of substantially the same width and thickness, but the dimensions of either may be varied as desired. Arm 14 is somewhat shorter than arm 15. A block of insulating material 22 is mounted on the free end of arm 14 and extends toward arm 15. The block is provided with a slot 23 (see Fig. 6). The end portion 25 of the arm 14 is bent at an angle against the rearward surface of the block and a slot is formed therein coinciding with and somewhat wider than slot 23. A tongue of metal 26 projects into the slot and is turned back substantially parallel to arm 14 and into tight engagement with the material at the base of slot 23, whereby block 22 is held firmly in position. A notch 24 is provided in the forward surface of block 22 for a purpose which will be explained hereinafter.

Arm 15 is solid and the free end portion 27 thereof is bent substantially at right angles toward arm 14. The width of end portion 27 is reduced at the point 28 and the end portion may be provided with a notch at this point. The portion of arm 15 adjacent to the insulating support 16 has a tongue 29 punched therefrom and projecting at an angle toward arm 14. Arms 14 and 15 both have end portions projecting beyond the opposite side of the insulating mounting 16 for the purpose of making connection to the electrical conductors supplying the translating device.

A third arm 30, which is composed of electrical conducting material is mounted upon the insulating mounting 16 and held in position by rivets 17. This arm is connected at its fixed end to the finger 79 of arm 14 and projects in the same direction as arms 14 and 15 but extends a relatively short distance. At its free end arm 30 carries contact 31 which may be of any suitable arc-resisting material, such as silver. Contact 31 is disposed in opposed relation to tongue 29.

A movable switch member, which is composed of thin spring metal, is mounted so that its free end moves with a snap between contact 31 and tongue 29. This spring member comprises a relatively long central tension strip 32 which passes within the slot 23 in insulating block 22, and two relatively short compression strips 33. All of the strips are joined together and carry a contact member 34 at their free ends, the said contact member being arranged to cooperate with contact 31. The tension strip 32 has an opening in its fixed end and this opening is adapted to be slipped over the reduced end portion 27 of arm 15 and into the notch mentioned heretofore. The ends of compression strips 33 are received in the slot 24 of insulating block 22. Tension strip 32 is in tension and compression strips 33 are bent in compression.

The pivoted ends of compression strips 33 normally are supported substantially to one side of the plane which is defined by the tension center line of tension strip 32 and a line which extends transversely through tension strip 32 parallel to the flat surface thereof as shown in Fig. 3. For the purpose of simplifying the description this will be called the tension plane of strip 32. Any movement of the supported ends of compression strips 33 from one side to the other of this plane causes the free end of the switch member to move with a snap in the opposite direction. That is, if arms 14 and 15 are moved apart at their free ends and cause the supports for strips 33 to cross the tension plane of strip 32 from the position shown in Fig. 3, contact 34 will move with a snap away from contact 31 and against tongue 29 to open the switch.

Arms 14 and 15 are each adapted to move laterally away from the other under the influence of temperature rise and toward the other under the influence of temperature fall in such manner so as to cause the supported ends of compression strips 33 to move across the said tension plane in a predetermined manner adapted to control the temperature of the translating device.

The control apparatus is connected in the electrical supply circuit for the translating device in the manner shown in Fig. 1. The supply lead 35 is connected directly to the translating device 10. The return lead 36 from the translating device is connected to the finger 80 of arm 14. The other electrical supply lead 37 is connected to the fixed end of arm 15. With the switch closed, so that contacts 31 and 34 are in engagement with each other, the circuit connections are as follows: From supply lead 35 through the translating device, return lead 36, fingers 80 and 79 of bimetallic arm 14, contact arm 30, tension strip 32 and bimetallic arm 15 to supply lead 37.

The operation of the temperature control apparatus is as follows: Under conditions of gradual temperature rise, the heat radiation from the windings of the translating device and the temperature of the air surrounding the control apparatus bear a substantially definite relation to the temperature of the hot zone. As a consequence, the heating effect upon the control apparatus bears a substantially definite relation to the temperature of the hot zone, which relation can be determined and is more reliable than the relation which obtains when an attempt is made to simulate the conditions of the hot zone by passing the load current, or a portion thereof, through a resistance type heating element and arranging the heating element in heat transfer relation to the control apparatus. A reliable relation is desired for reasons which will be explained hereinafter. Arm 15 is constructed and arranged so that the warping thereof bears a relation to the heating effect to which it is subjected and the opening of the switch takes place when the temperature of the hot zone reaches the maximum safe point.

In the preferred construction, the lateral dimensions of arm 15 are larger than those of arm 14 and arm 15 is composed of metals having a greater difference in thermal expansion properties than is arm 14 whereby the actual temperature required to exist in arm 15 in order for it to cause operation of the switch is considerably lower than that required to exist in arm 14 in order for the latter to cause operation of the switch. Arm 15, for this reason, controls the translating device substantially independently of arm 14 under conditions of gradual temperature rise. However, if desired, arm 14 may be constructed in such manner that it is warped appreciably by gradual temperature rise, since this may be taken into consideration in calibrating the apparatus.

Under conditions of rapid temperature rise, such as occurs when the device is stalled or subjected to a short-circuit, the above mentioned relation between the hot zone temperature and the heating effect upon the control apparatus is disturbed and the hot zone reaches the maximum safe temperature more rapidly than arm 15 reaches the operation position. In other words, there is a local temperature rise which is so rapid as to produce damage before the more general temperature rise of the device and of the air will cause operation by arm 15. The arm 14 is adapted to cause operation in such case. The two fingers of this arm are connected in series with the electrical supply circuit and possess the correct amount of electrical resistance to cause this arm to become heated by the large current flowing therethrough and operate the switch promptly. It is not necessary that an accurate relation be maintained between the temperature of the hot zone and that of arm 14 because the only requirement is that the switch be opened before the hot zone reaches the maximum safe temperature.

The arrangement described provides an apparatus by means of which both gradual temperature rise and rapid temperature rise are protected against most advantageously. If the translating device has previously been heated gradually to a relatively high temperature, but one which is not high enough to cause operation by arm 15, the switch will be opened relatively quickly when a large overload occurs because the position of arm 15 has been changed by the said gradual temperature rise so as to reduce the distance through which arm 14 must move in order to cause operation. This obviously is a desirable condition.

Another important advantage of the apparatus of this invention lies in the fact that the temperature at which arm 15 causes operation under conditions of gradual temperature rise is substantially independent of the current flowing through the motor. Fig. 7 shows the temperature of the air within a ⅛ horsepower motor at the time of switch operation by arm 15 under different values of current flowing through the motor. A load of 4 amperes is 150% of rated capacity for the motor in question. If arms 14 and 15 are warped appreciably by relatively small current flowing therein a serious limitation results upon the usefulness of the translating device. For economical operation, translating devices should operate at or near their rated capacities and are designed to carry without injury the occasional small overloads which occur, and the control apparatus should permit them to do so. In many mixing operations, for instance, the material to be mixed is stratified and stiff at the outset, but becomes more homogeneous and mobile as the mixing proceeds, and a properly designed translating device can carry the initial extra load as an overload. If any factors which are not truly representative of the temperature of the hot zone are permitted to affect the operation of the control apparatus, under conditions of gradual temperature rise, the latter will not accommodate the small overloads that the device is capable of handling. As an example, if arms 14 and 15 are warped appreciably by relatively small current flowing therein, the control mechanism may operate to disconnect the energy supply before the hot zone had actually reached a dangerous temperature, because such current does not have the same cumulative effect upon the temperature of the arms of the control apparatus as it does upon the translating device and furthermore, the temperature rise of the translating device may be due to other factors, such as restricted ventilation, increased friction at the bearings, or rising ambient temperature, etc.

In order to accomplish the desired result, arms 14 and 15 are constructed and arranged in such manner that relatively small current flowing therein does not cause the same to warp appreciably. The resistance of arm 15 is caused to be very small whereby the current flowing therein, even when large, does not cause any appreciable warping thereof. As regards arm 14, this arm warps upwardly, as viewed in Fig. 3, against the restraining force exerted by compression strips 33 against the end of arm 14 and the warping of a bimetal element against a restraining force represents work performed thereby. The work which a bimetal element is capable of performing is proportional to the fourth power of the current flowing therein, since it is proportional to the square of the temperature change, which in turn, is proportional to the square of the current. In a one-eighth horsepower single phase motor of standard make, the current at 150 percent rated capacity, which is a typical small overload, is 4 amperes, and the current where there is a short circuit or when the motor is stalled, which is the large overload condition, is approximately 16 amperes. The ratio of the work which arm 14 is capable of performing in the two cases is as 1 is to 256. Arm 14 is formed with its cross sectional dimensions just small enough that it is incapable of performing any appreciable work under the heating effect of relatively small overload current. Such dimensions are found to be large enough to produce prompt and positive warping to the operating position upon the occurrence of large overload current in arm 14, because of the greatly increased work of which the arm is capable. There is a further feature of construction of my improved control apparatus which restricts the warping of arm 14 under the influence of relatively small current flowing therein. As arm 15 becomes curved under the influence of heat, the point of attachment between arm 15 and tension strip 32 moves to the right, as viewed in Fig. 3. This results in increased compression upon compression strips 33 and a larger lateral restraining force upon arm 14. Hence, as the temperature of the translating device increases more work is required on the part of arm 14 to produce the warping thereof. This effect may be varied by varying the lateral distance between the longitudinal portion of arm 15 and the point of attachment of tension strip 32.

In the apparatus of Figs. 1 through 6, after the switch has operated and the circuit is open, the arm which caused operation cools off and when it returns to a predetermined temperature the pivotal supports for compression strips 33 cross the tension plane of tension strip 32 again. The temperature at which this takes place may be regulated by changing the lateral position of tongue 29 by bending the same. If the latter is moved nearer to contact 31 the switch will close at a higher temperature, and vice versa. The temperature at which the switch opens may be regulated also. This is done by changing the lateral position of stationary contact 31 by bending arm 30. If contact 31 is moved toward tongue 29 the switch will open at a lower temperature, and vice versa.

The fact that the temperature at which the control apparatus will open and close can be regulated may be an important advantage. An example is furnished in the case of a mechanical refrigerator where the apparatus is used to control the motor which operates the compressor. When the temperature of the refrigerator is being lowered a considerable amount, the motor often operates under a small overload long enough to cause the control switch to operate. After this occurs, there is an optimum period of time during which the switch should remain open. If it closes too soon the motor will be unable to start the compressor against the pressure in the condenser. Sufficient time should be permitted to elapse for the pressure to become lowered to a point such that the motor can start readily. On the other hand, if the period of inaction is too long the refrigerator will become warmed to an undesirable extent. The optimum period of inaction may be obtained by the proper adjustment of the position of tongue 29.

In the apparatus illustrated in Fig. 8, the switch does not return to the closed position automatically. A manually operated push-button 35' is adapted to move the free end of the switch member back to the closed position. The push-button 35' operates in a sleeve member 36' which is mounted fixedly in an opening in bimetal arm 15. Annular projecting beads 38 and 38' are provided upon the exterior of push-button 35' to limit its travel. The beads 38 and 38' may be formed by arranging split rings of spring metal in circumferential grooves in the surface of the push-button.

The inner end of push-button 35' is spaced far enough from contact 31 that arms 14 and 15 may cool to room temperature without causing the switch to return to the closed position, and the push-button must be depressed in order to close the switch. Stop 38' is arranged so as to prevent the switch arm contact 34 from being pushed directly against stationary contact 31 so that the switch can not be closed until it has cooled somewhat, this temperature again being regulable by changing the location of stop 38'. This form of apparatus is adapted for types of service where it is desired to make sure that the cause of the overload has been removed before the switch is closed again.

The apparatus of Fig. 8 is adapted for both automatic and manual re-closing of the switch. If automatic re-closing is desired, push-button 35 may be depressed and pivotally mounted retaining member 40 may be swung around parallel to frame 20 and over the end of push-button 35'.

The temperature control apparatus of this invention is adapted for use for multiple voltage translating devices, that is, translating devices which are adapted to be operated equally well by one of several different voltages. For instance, some translating devices are constructed to operate on either 110 or 220 volts, the user thereby deriving greater flexibility of service. For such a translating device the control apparatus is the same as has been described heretofore except that bimetal arm 14 is composed of four sections in series with one another instead of two. This arm is illustrated in Figs. 9 and 10, which also show diagrammatically the method of connecting the control apparatus when the different voltages are used. Fig. 9 illustrates the connections employed when a 110 volt power supply is used. Power supply conductor 49 is connected to the junction of the two middle sections 41 and 42 of arm 14. The current travels in two substantially equal paths, one through sections 41 and 43 and a conductor 45, and the other through sections 42 and 44, to contact arm 30. The current then continues through the tension strip 32, bi-metallic arm 15 and conductor 46 to the translating device 47. The other supply conductor 48 is connected directly to the translating device.

When 220 volts is used the current required for the same power output is substantially one-half that required when 110 volts is used, and in order to secure the same relation of heating effect upon arm 14 to power output, and protect the translating device, the current is conducted through the four sections of the arm 14 in series. In this arrangement one power supply conductor 50 is connected to the end section 43 of the arm 14, the other end section 44 being connected to contact arm 30, as shown in Fig. 10. The current in this case traverses supply conductor 50 and the four sections of arm 14 in series, then arm 30, tension strip 32, bimetallic arm 15 and conductor 51 to the translating device 52. The other supply conductor 53 is connected directly to the translating device.

Figs. 11 and 12 illustrate an arrangement in which two controls are used to protect a 3 phase translating device 59. The controls 60 and 61 are located adjacent to different portions of the field winding and preferably adjacent to the coils of different phases, whereby each is affected by that portion of the air which is heated by the adjacent portions of the windings and of the stator iron. The power supply conductors 62 and 64 are connected in series with the slotted thermostatic arms of controls 60 and 61 respectively. The circuit connections are indicated in Fig. 12. A separate control circuit 68 is employed (not indicated in Fig. 11) and a circuit breaker 65 is connected in the main circuit and is adapted to be operated by the solenoid 66 in the control circuit. The control circuit 68 is connected through the controls 60 and 61 to the supply conductors and contains the control switches and the solenoid 66 in series connection. The contact arm 87 of control 61 is electrically dissociated from thermostatic arm 14. The construction of this control apparatus and the connections therefor are described in connection with Figs. 13 and 14.

Upon the occurrence of small overloads the thermostatic arm 15 of either control is adapted to cause the switch to open, whereupon solenoid 66 becomes deenergized and the spring 67 causes the circuit breaker 65 to open.

Upon the occurrence of a high overload in either supply conductor 62 or 64 the arm 14 of the control in series with said conductor becomes heated and causes operation of the switch with the same result.

In the construction shown in Figs. 13 and 14 finger 80 of arm 14 is permanently connected to arm 15 by means of rivet 85. The stationary contact 86 is mounted on a short metallic arm 87 which is electrically insulated from arm 14 by means of sheet 88 of electrical insulating material. Arm 87 has an opening 89 therein which is larger than rivet 85 whereby arm 87 is electrically insulated from rivet 85. Arm 15 has an opening 90 therein which is larger than rivet 18 whereby these two members are electrically insulated from each other. Fingers 79 and 80 of arm 14 are connected in series with supply conductor 64 and contact arm 87 is connected to control circuit 68.

With this modification a mounting plate 91 of heat insulating material, such as phenol condensation resin, an asphalt base resin, hard fiber, or the like, is used. Such a mounting plate may be used with any form of the control apparatus of this invention.

Under certain conditions it may be desirable to have the thermostatic arm 14 heated by means of a separate resistance member rather than have the current pass directly through the arm. In such case a construction such as is illustrated in Fig. 15 may be used. Thermostatic arm 14 is arranged in the same manner as described heretofore and is surrounded by a thin sheet of suitable electrical insulating material 70 such as mica, about which is coiled a resistance wire 71. One end of the resistance wire 71 is connected to the supply conductor 72 and the other end is connected by contact arm 30, the switch contacts, tension strip 32, bimetallic arm 15, conductor 73, translating device 74 to supply conductor 75. Thermostatic arm 14 is not connected in the supply circuit. Upon the occurrence of a high overload, resistance member 71 becomes heated and the heat is transmitted through the thin sheet 70 to the thermostatic arm 14 which functions in the manner described heretofore.

A further modification of the control apparatus of this invention is illustrated in Fig. 16. In this form the pivotal support 100 for the compressing strips 101 is of electrical conducting material and is mounted in fixed relation upon the mounting plate 102 of heat and electrical insulating material. The support 100 is substantially U-shaped and forms a support for the angular bimetallic arm 103. Tension strip 104 is pivotally mounted on arm 103. Bimetallic arm 103 is arranged so that it warps downwardly, as viewed in Fig. 16, under the influence of temperature rise, whereby it will cause the switch to open. A second bimetallic arm 105 is mounted upon support 100 and is arranged against the interior side of arm 103. Arm 105 is arranged to warp upwardly under the influence of temperature rise, so as to oppose arm 103. Arm 105 is constructed in such manner that it is capable of less work than arm 103, the relation being such that under gradual temperature rise arm 103 will cause the switch to open at the desired temperature.

A resistance type heater element 106 is connected in the load circuit of the translating device, and is arranged adjacent the exterior side of arm 103 and is adapted to radiate heat directly against arm 103. The circuit connections are as follows: from supply conductor 108 through terminal 109 and heater element 106 to support 100 and arm 103, and thence by parallel paths to contact member 107, one path being through bimetallic arm 103 and tension strip 104 and the other through support 100 and compression strips 101, and from contact member 107 to supply conductor 110.

Arm 103 shields arm 105 from the heat radiated from heater member and the heat is not transferred from arm 103 to arm 105 by conduction with much efficiency because they are spaced apart throughout most of their area. If desired, a sheet of heat insulating material may be arranged between the two arms.

The operation of this control is as follows: Under conditions of gradual temperature rise arms 103 and 105 are heated equally and oppose each other but the response of arm 103 preponderates and the support for tension strip 104 moves downwardly, and causes operation of the switch at the desired temperature. When a large overload current flows in heater 106, the heating effect thereof upon arm 103 supplements the heating effect of the rising temperature, whereby the operation of the switch occurs promptly, as desired, and at a surrounding temperature which is considerably lower than it is when the switch operates under the influence of gradually rising temperature. The flow of large current through heater element 106 produces relatively little heating effect upon bimetallic arm 105.

This invention provides a control apparatus which is simple, compact and economical and which is easy to install. It provides complete protection against the different conditions which cause execessive heating in a translating device, and it is flexible in that it is adaptable to many different conditions, as explained above. As a further example of its flexibility, a standard construction may be adopted at the factory for use with translating devices of a great variety of sizes. If any particular translating device requires adjustment with respect to the temperature at which arm 15 operates this can be made by bending arm 30, as described heretofore, and if the translating device is so large that it is inadvisable for the full load current to traverse arm 14, a suitable resistor may be connected in shunt with arm 14, or the control apparatus may be connected in a separate control circuit, as shown in Fig. 12. If it is desired to increase the power of arm 15 to absorb radiated heat, this may be done by applying a dull black coating to the surfaces of the arm by painting or otherwise.

The term "translating device" as used in the specification and claims is intended to include transformers.

I claim:

1. A thermal control apparatus for a translating device comprising a switch having cooperating stationary and movable switch contacts, two supports for said movable contact, said supports being arranged so that predetermined relative movement thereof causes movement of said movable switch contact into the operated and nonoperated positions, two heat responsive members, said members being mounted so as to move in opposite directions under the influence of heat, and means for transmitting the movement of said heat responsive members to said supports for said movable contact, said heat responsive members being in heat transfer relation to said translating device, at least one of said heat responsive members being heated in accordance with the current flowing in said translating device, said heat responsive members being arranged so as to transmit said predetermined movement to said supports under predetermined temperature conditions of said translating device.

2. A thermal control apparatus for a translating device comprising a switch having two heat-responsive members, said switch being adapted to be operated upon predetermined relative movement of said members, said heat responsive members being so mounted that said members when heated move relative to each other and that the movement of each member when heated is in the direction that tends to increase said relative movement of said members for operating said switch, one of said members being responsive to the temperature of said translating device to cause operation of said switch and at least one of said members being heated in accordance with the current flowing in said translating device and being responsive to such heating effect to cause operation of said switch.

3. The thermal control apparatus of claim 2 in which the current flowing in the translating device flows through both heat-responsive members, the resistance characteristics of one being such that said current produces no appreciable warping thereof.

4. The thermal control apparatus of claim 2 in which the thermostatic element which is heated in accordance with the current flowing in the translating device is also heated in accordance with the temperature of the translating device.

5. The thermal control apparatus of claim 1 in which the heat-responsive member which is heated in accordance with the current flowing in the translating device is so constructed and arranged that the heat transmitted to it from the translating device causes no appreciable warping thereof.

6. A thermal control apparatus for a translating device comprising a switch comprising two heat-responsive members, said members being adapted to move relatively to each other under the influence of heat and being in heat-receiving relation to said translating device and being heated in accordance with the current flowing in said translating device, said heat responsive members being so mounted that the movement of each member when heated is in the direction that increases the relative movement produced by individual movement of the other member, said switch being adapted to be opened and closed upon predetermined relative movement of said heat-responsive members, the movement of one of said members being due substantially entirely to the heat received from said translating device and the movement of the other member being due substantially entirely to the current flowing therein.

7. A thermal control apparatus for a translating device comprising a switch mounted in direct heat-transfer relation to said translating device, said switch having cooperating stationary and movable contacts, said movable contact being mounted upon two movable supports and being adapted to operate upon predetermined movement of either of said supports, means comprising a thermostatic element for moving each of said supports, one of said thermostatic elements being responsive to the temperature of said device to cause operation of said movable contact, the other of said thermostatic elements being heated in accordance with the current flowing in said translating device and being responsive to such heating effect to cause operation of said movable contact.

8. The thermal control apparatus of claim 7 in which the thermostatic element which is responsive to the temperature of the translating device is arranged in the path of radiant heat emitted from the windings of said translating device.

9. The thermal control apparatus of claim 7 in which the movable contact is adapted to remain in the operated position until it is moved mechanically therefrom.

10. The thermal control apparatus of claim 7 in which the movable contact is adapted to return to the nonoperated position upon predetermined return relative movement of said supports.

11. A thermal control apparatus for a translating device comprising a switch mounted in heat-transfer relation to said translating device, said switch having cooperating stationary and movable contacts, said movable contact being mounted upon two movable supports and being adapted to operate upon predetermined relative movement of said supports, said supports comprising heat responsive members, both of said supports being in heat-receiving relation to said translating device and being heated in accordance with the current flowing in said translating device, the heat response of one of said supports being due substantially entirely to the heat received from said translating device and the heat response of the other support being due substantially entirely to the current flowing therein.

12. A thermal control apparatus for a translating device having fluid cooling means flowing therethrough comprising a snap action switch having cooperating stationary and movable contacts, said movable contact being mounted upon two movable supports and being adapted for snap operation upon predetermined relative movement of said movable supports, said supports comprising thermostatic elements, said switch being mounted in the outlet of the fluid cooling means, one of said thermostatic elements being responsive to the temperature of said fluid cooling means to cause operation of said switch, and the other thermostatic element being heated in accordance with the current flowing in said translating device and being responsive to such heating effect to cause operation of said switch.

13. A thermal control apparatus for a translating device comprising a mounting plate for mounting said apparatus upon said translating device, a member of heat and electrical insulating material mounted upon said mounting plate, two thermostatic elements mounted upon said insulating member and insulated from each other by said insulating member, a stationary contact mounted upon said insulating member, a movable contact mounted at different points upon said thermostatic elements and adapted for operation upon predetermined movement of either of said elements, one of said thermostatic elements being constructed and arranged so as to cause operation of said movable contact at a predetermined ambient temperature, the other thermostatic element being constructed and arranged so as to cause operation of said movable contact upon passage of a predetermined current therethrough.

14. The construction of claim 13 in which the mounting plate comprises heat insulating material.

15. A thermal control apparatus for a translating device comprising a block of electrical and heat insulating material adapted to be mounted on said translating device, two thermostatic arms each mounted at one end thereof upon said insulating block and projecting in the same direction from said block, said arms being spaced from each other and insulated from each other by said block, a stationary contact mounted upon said block, a movable contact member mounted at one end upon the first of said thermostatic arms and at an intermediate point upon the second of said thermostatic arms and having a movable contact at the free end thereof adapted to cooperate with said stationary contact and to move into the operated and non-operated position upon predetermined relative movement of said arms, one of said arms being responsive to the temperature of said translating device to cause operation of said movable contact and the other of said arms being heated in response to the current flowing through said translating device.

16. A temperature control apparatus comprising a support of insulating material, two bimetallic arms mounted upon said insulating support in spaced, substantially parallel relation and projecting in the same direction from said insulating support, both of said arms having their end portions turned at an angle toward the other, one of said arms being shorter than the other and having the angular end portion thereof slotted, a slotted block of insulating material mounted within the angle of said shorter arm, the slot of said insulating block coinciding with the slot of the end portion of said shorter arm, a contact arm mounted pivotally upon the end of said longer thermostatic arm and passing through said slots in said insulating block and said shorter arm, two additional contact arms pivotally supported upon said insulating block and extending in the same direction as said first contact arm, said contact arms being connected together at their free ends, the second contact arm being in compression and the first contact arm being in tension, an electrical contact mounted at the free ends of said contact arms, and a stationary contact mounted upon said insulating mounting and in cooperative relation with said first contact, said first contact being adapted to move out of contact with said stationary contact upon predetermined relative lateral movement of said bimetallic arms.

ARTHUR LEWIS RICHE.